United States Patent [19]
Cecil

[11] Patent Number: 5,470,602
[45] Date of Patent: Nov. 28, 1995

[54] BROCCOLI HEAD TRIMMING APPARATUS AND METHOD

[75] Inventor: Christopher R. Cecil, Merced, Calif.

[73] Assignee: David J. Moore, Jacksonville, Oreg.; a part interest

[21] Appl. No.: 345,036

[22] Filed: Nov. 25, 1994

[51] Int. Cl.$^6$ .............................. A23P 1/00; A23N 15/00
[52] U.S. Cl. .............................. 426/481; 99/537; 99/635; 99/642; 99/643; 426/518
[58] Field of Search ...................................... 426/481, 482, 426/518; 99/537, 567, 635, 636, 637, 638, 642, 643; 83/409, 431

[56] References Cited

U.S. PATENT DOCUMENTS

| | | | |
|---|---|---|---|
| 3,478,794 | 11/1969 | Alpen | 99/637 |
| 4,241,096 | 12/1980 | Shaw | 426/518 |
| 4,773,324 | 9/1988 | Wylie et al. | 99/638 |
| 5,009,909 | 4/1991 | Hirtle et al. | 426/481 |
| 5,156,874 | 10/1992 | Switek, Jr. | 426/518 |
| 5,277,107 | 1/1994 | Tuvatti | 99/635 |

*Primary Examiner*—George Yeung
*Attorney, Agent, or Firm*—Lothrop & West

[57] ABSTRACT

Broccoli fleurettes are rapidly trimmed from broccoli heads by positioning the heads accurately so that the axes of the head stalks intersect the axes of rotation of special U-shaped guillotine blades shaped and dimensioned to trim fleurettes of substantially uniform size. The heads are securely but yieldably pre-positioned in an upward direction, followed by final positioning by a dome shaped cap designed so that optimum trimming is effected and the cut fleurettes are directed toward a collecting station. Denuded stalks are ejected and recovered for further use. The process is characterized by an electronically programmed operation providing both accuracy and speed.

5 Claims, 7 Drawing Sheets

*Fig. 10*  OPERATIONAL SEQUENCE IN ONE CYCLE

BROCCOLI HEAD TRIMMING APPARATUS AND METHOD

BACKGROUND OF THE INVENTION

1. Field of the Invention

The invention relates to improvements in processes and machines for separating the fleurettes from a head of broccoli.

2. Prior Art

Preliminary searches turned up a variety of methods, apparatus and systems for trimming broccoli and the like to provide fragments, such as fleurettes, suitable for packing and freezing or for salad bars. Fragmentation has been effected by positioning the head to be trimmed and then cutting the base of the fleurettes from the stalk of the head so that all of the severed fleurettes are about the same size.

In Hirtle, et al., U.S. Pat. No. 5,009,909, for example, the article, such as a head of cauliflower, is held in a fixed, head down position by an impaling knife, or pin, inserted in the upwardly facing core while a set of rotating coring knives of special design are moved into engagement with the article to separate the fleurettes from the core.

Switek, Jr., U.S. Pat. No. 5,156,874, grasps the stem, or stalk, end of a head of broccoli in clamping jaws with the main portion of the head depending vertically downwardly. A plurality of slicing knives then moves upwardly to slice through the main portion of the head depending vertically downwardly. A plurality of slicing knives then moves upwardly to slice through the main portion of the head and severs the central stem portion from the peripheral sliced portion to provide spears of similar size and shape. Thereafter a rotary knife separates the still-connected stem ends of the spears from the central stem, allowing the freed spears to drop onto a discharge conveyor.

Wylie et al., U.S. Pat. No. 4,773,324, discloses a broccoli trimming machine in which the broccoli heads are held by a pair of opposed clamping arms and gripper shoes. The head is divided into multiple segments by a segmenting knife, followed, if desired, by removing excess stalk by a butt cut knife, followed by separating the individual fleurettes by use of a spinning, generally semispherical, or bowl-shaped, cutter which sweeps through approximately 90 degrees, while severing the fleurettes, the force exerted by the bowl against the head being resisted by a backstop plate.

Shaw, U.S. Pat. No. 4,241,096, provides a method and apparatus for coring cauliflower heads. The cauliflower heads are lodged in individual bowls provided with spikes on which the heads are impaled with the root, or cull, portion of the head being disposed upwardly. A first rotary blade descends into cutting engagement with the head so as to remove the culls, leaving only the curds, i.e. the edible part of the head. This step is followed by applying a rotary cutting action to the head, breaking it into a number of edible curds which are removed to a collection station.

The foregoing references represent the most pertinent art known to applicant and applicant believes that none of them, taken either distributively or in combination, either anticipates or renders obvious the apparatus and method of the present invention.

SUMMARY OF THE INVENTION

An inflatable elastomeric collar mounted on a conveyor flight securely holds the stalk portion of a head of broccoli in upright attitude. As the head approaches the trimming station, a first proximity switch senses a flag on the conveyor flight and, through a programmable controller, slows the conveyor speed so that a second proximity switch brings the conveyor to a dead stop at a precisely indexed position.

This precision indexing enables a reciprocating, pivotally mounted, U-shaped, guillotine blade to approach the head and then halt with the pivot axis of the guillotine blade on a diameter of the stalk supporting the arcuately arranged fleurettes. The blade is dimensioned so that as the blade is actuated the fleurettes are cut off at approximately the point where the stems of the fleurettes join the stalk. After trimming is effected, the guillotine blade is withdrawn and reverts to base position. The fleurettes fall away by gravity and are removed.

The longitudinal, or axial, stability of the broccoli head is enhanced by a positioning cap with a recessed dome-shaped surface which engages the top of the head during trimming. The cap also serves to position the head axially and acts as a deflector, or shield, preventing undue dispersal of the fleurettes as the sharp, guillotine blade sweeps through the head at high velocity.

The positioning cap can, if desired, be provided with axially oriented segmenting blades to split the central portion of the head into spears where certain varieties of broccoli are best trimmed by such treatment.

DETAILED DESCRIPTION OF A PREFERRED EMBODIMENT OF THE INVENTION

While the broccoli trimmer and method of trimming broccoli disclosed herein are susceptible of different embodiments and operational sequences, depending upon the environment and requirements of use, a prototype constructed to a reduced scale has been made and operated pursuant to the method disclosed herein and has performed in a very satisfactory manner.

The broccoli trimmer of the invention, generally designated by the reference numeral 11, includes the following major components, as appear most clearly in FIGS. 1-4: an elongated frame 12, a longitudinal conveyor 13 supported on the frame 12 and adapted to transport the product to be trimmed from a loading station 14 through a stalk prepositioning station 15 to a trimming station 16. After trimming, the lower run of the conveyor carries the denuded stalk to a stalk-ejecting station 17. Adjacent the trimming station 16 is a fleurette collecting station 18; and adjacent the stalk pre-positioning station 15 and the stalk-ejecting station 17 is a collar-inflating station 19. A pressurized air supply 20 provides air to a manifold 54, thence through appropriately positioned hoses for a variety of purposes, as will subsequently be described in more detail.

The major mechanical components are electronically coupled to a programmable controller 21, such as an Allen-Bradley SLC-500, which receives signals and directs commands to the components in compliance with programmed instructions.

The elongated frame 12 is fabricated from the customary structural steel shapes 22 and extends longitudinally from one end 26 adjacent the loading station 14 to an opposite end 27 adjacent the trimming station 16. In a transverse direction the frame extends from a left side 28 to a right side 29 when viewed from along the path 30 of the upper run 31 of the conveyor 13.

The conveyor 13 comprises a plurality of transversely oriented flights 32, each including a flat, stainless steel plate supported on opposite ends by a spaced pair of parallel endless chains 33 trained about a respective pair of loading end sprockets 34 and trimming end sprockets 35, the sprockets 34 being journaled in bearings mounted on the frame.

The trimming end sprockets 35 are driven by an electric motor 36 through a reduction gear box 38. An electric clutch brake 37 affords quick stop capability. The gear box shaft 39 is connected by a clutch 40 to a cross-shaft 41 spanning the frame 12 transversely and carrying the sprockets 35, the cross-shaft 41 being journaled in bearings mounted on the frame. The cross-shaft 41 thereby drives both of the trimming end sprockets 35 and the chains 33 carried on the sprockets at the same speed.

Figure 1:
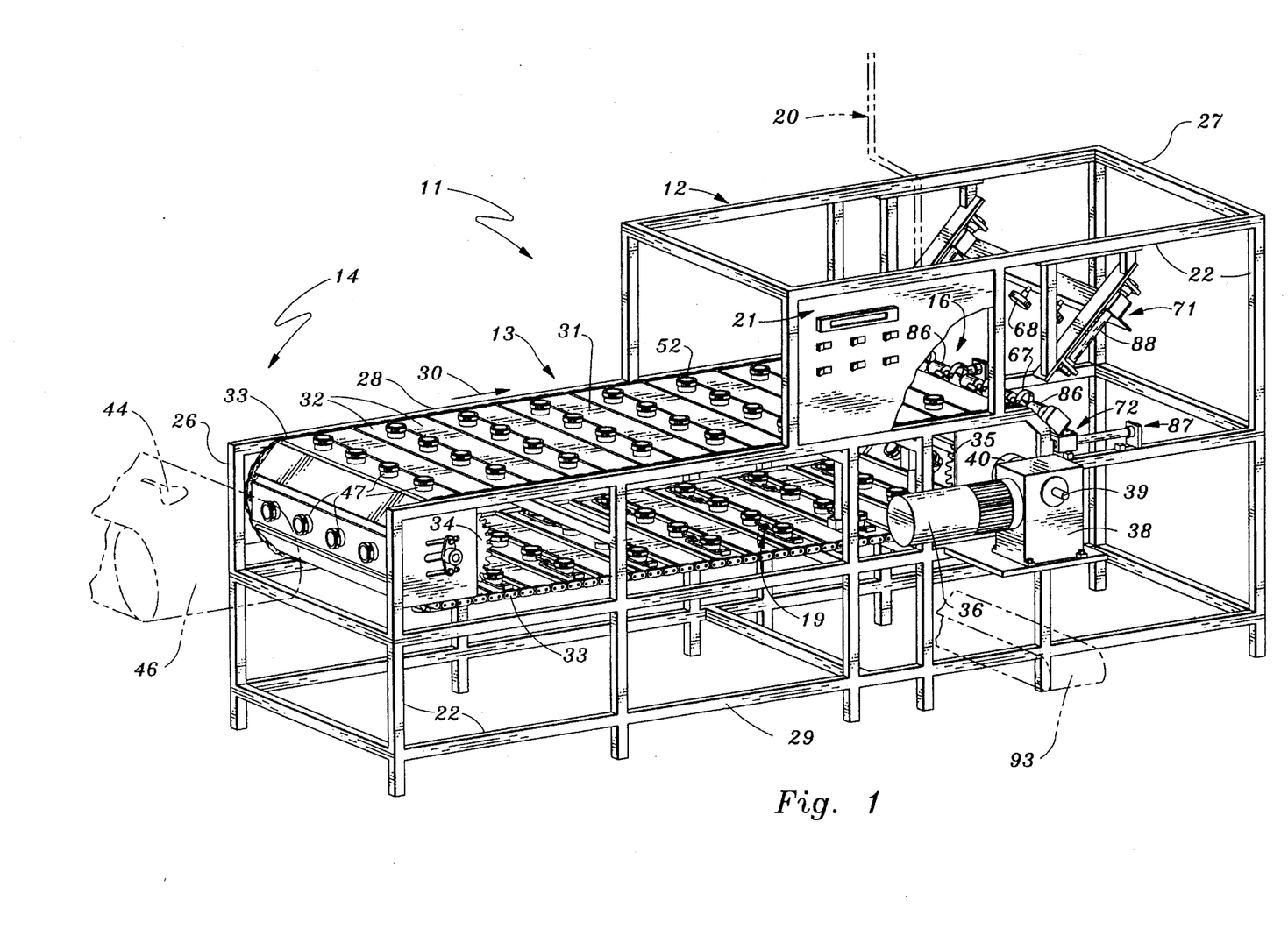
FIG. 1 is a stylized right front perspective view, of a preferred embodiment of the broccoli trimmer of the invention, with portions broken away to reveal underlying structure.
Figure 2:
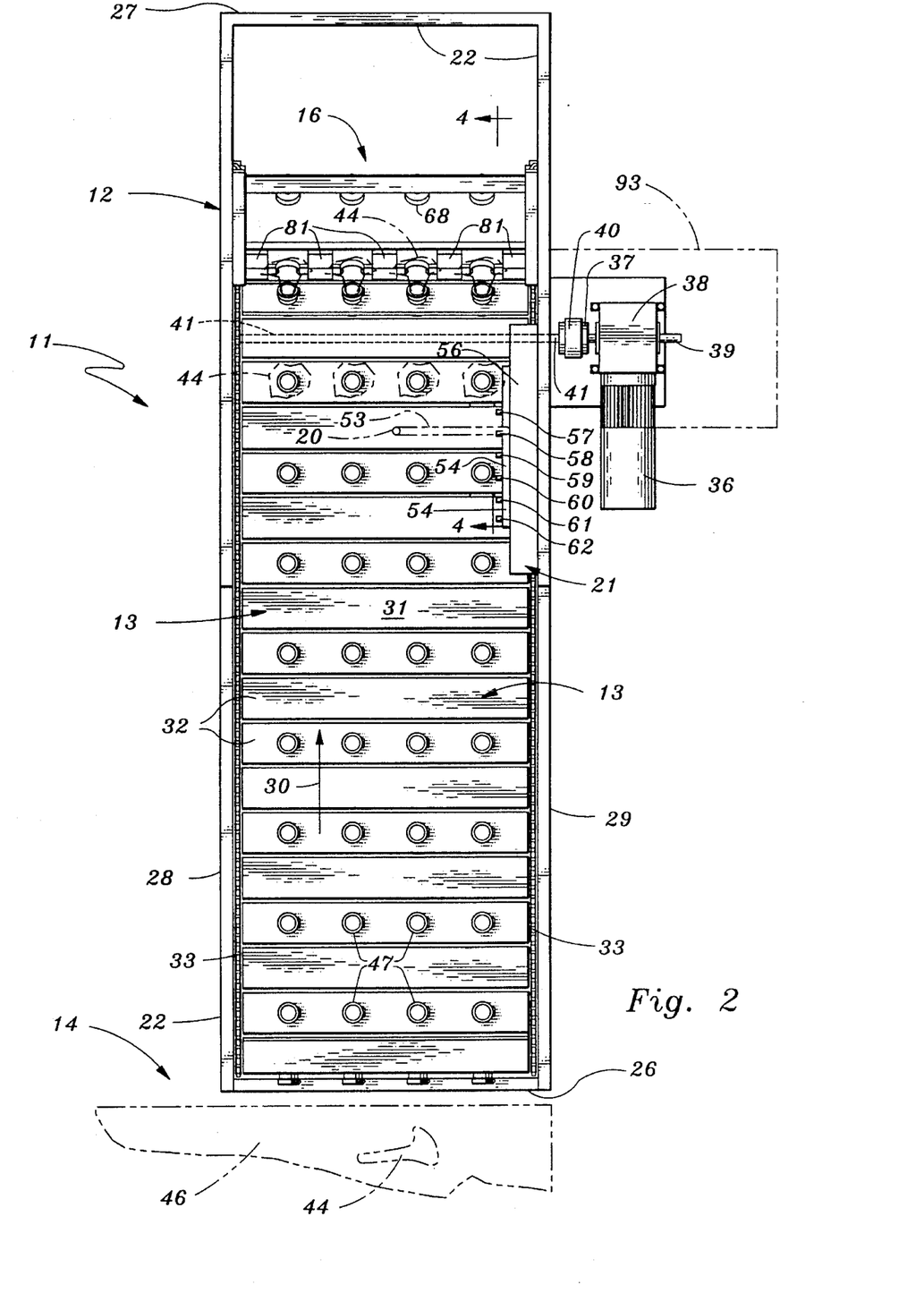
FIG. 2 is a top plan view thereof.
Figure 3:
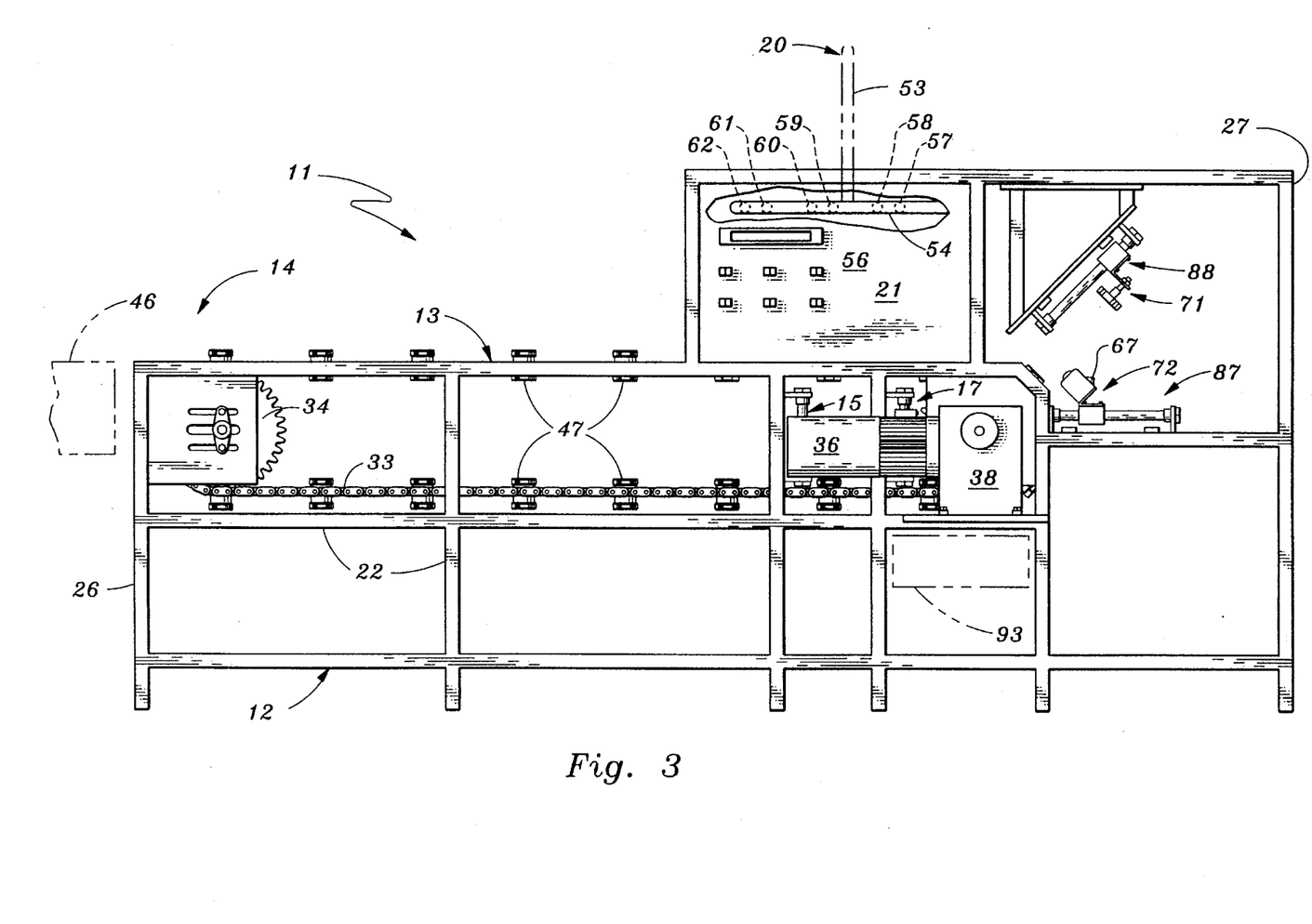
FIG. 3 is a right side elevational view.

Incoming heads of broccoli 44, each including a flower portion 42, or top portion, and a stalk portion 43 are delivered by a cross-conveyor 46, shown in broken line in FIGS. 1-3, located adjacent the loading station 14 so that one or more operators can readily transfer broccoli heads to the conveyor 13 each time the conveyor stops to allow trimming and other operations to take place.

Figure 8:
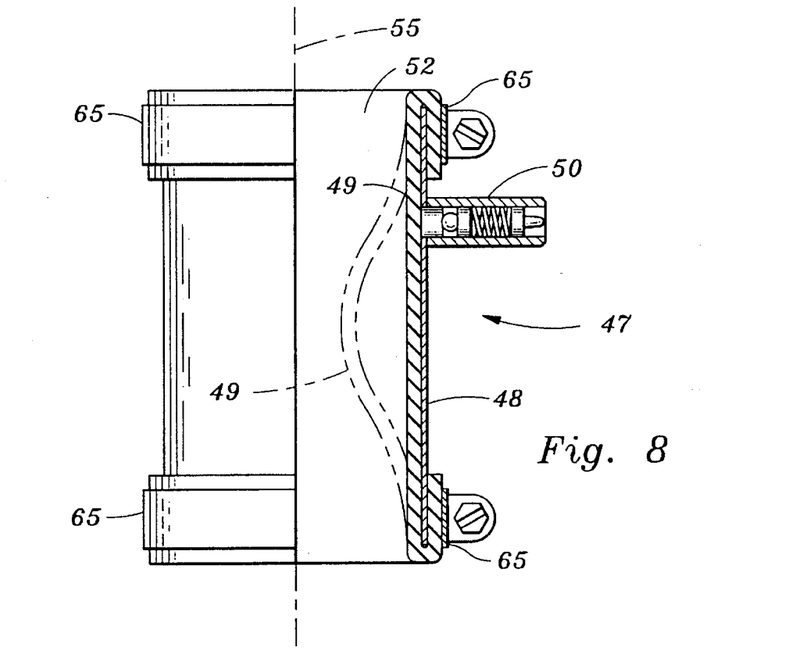
FIG. 8 is a side elevational view, to an enlarged scale, of the inflatable collar, with portions broken away to reveal the construction of the cylindrical shell and the double-walled, air-inflatable, elastomeric liner which grips the stalk.

In order to hold the broccoli heads 44 securely in upright attitude with the fleurettes exposed, a special collar 47 is utilized. As best appears in FIG. 8, the collar 47 comprises a rigid, hollow, cylindrical shell 48 and an inflatable, elastomeric, sleeve 49, or lining, or insert, secured to the ends of the shell 48 by a pair of end clamps 65. In communication with the internal space between the shell 48 and the end-clamped insert 49 is an air check valve 50, such as a Schroeder valve, to allow ingress of pressurized air, thereby inflating the unclamped portion of the insert 49 and providing a secure frictional, resilient gripping effect on the stalk 43 of the head 44 of broccoli as the operator urges the stalk 43 butt end downwardly into the vertically elongated, axially aligned opening 52 defined by the pneumatically inflated insert 49 (see FIG. 9A).

As will subsequently be explained in more detail, mechanism is provided for charging the insert 49 with air to any desired pressure and for automatically recharging the insert at predetermined intervals of time subsequent to the initial inflation, (for example, at the beginning of each shift) to compensate for any air leaks.

The supply of pressurized air 20 extends through a conduit 53 to an air manifold 54 on a control panel 56 mounted on the frame 12 at a location adjacent the drive motor 36. In communication with the pressurized air manifold 54 is a plurality of air valves whose operations are regulated by the programmed controller 21 mounted on the control panel 56.

Included among the various air valves mounted on the control panel 56 is a broccoli head positioning cap valve 57, guillotine blade assembly valve 58, blade actuator valve 59, broccoli stalk ejector valve 60, collar lining air charging valve 61 and stalk pre-positioner valve 62.

In the embodiment disclosed herein, the apparatus of the invention is reduced in size from the commercial version. However, the same type of components and the same sequence of operations, as in the commercial counterpart, are shown and described.

The movement of the conveyor 13 is intermittent, with the successive advances of the flights 32 along the path 31 being programmed so that in each cycle the conveyor 13 starts, moves ahead exactly the distance between the vertical axes 55 of successive collars 47 and then comes to a dead stop at precisely the correct location for trimming.

This precision is made possible by substantially reducing the forward speed of the conveyor 13 at a predetermined distance prior to the conveyor's coming to a dead stop. In other words, by reducing the speed, the inertia of the conveyor and associated components is markedly diminished, the inertia being a function of mass and the square of the velocity of the mass.

Speed reduction of the conveyor 13 at the critical juncture is accomplished herein by mounting a flag 63 on the conveyor. The flag 63 is preferably a metal strip so arranged and located on the conveyor that it actuates a first proximity switch 64 mounted on the frame 12 and connected to the controller 21. See FIGS. 4 and 5.

As the first proximity switch 64 senses the approach of the flag 63, the power to the motor 36 is reduced and the electric clutch brake 37 is actuated. The motor 36 and the electric clutch brake 37 respond to such an extent that as the metallic flag 63 approaches and makes its influence felt on a second proximity switch 66 on the frame 12 the power to the motor is interrupted and the electric clutch brake 37 is able to halt movement of the conveyor 13 virtually instantaneously and position the conveyor at the precise location desired (see the conveyor speed sequence in FIG. 10).

Exact positioning of the broccoli heads 44 results in optimum trimming of the individual fleurettes 51 (or florets) which are the small flowers forming all or most of the top portion 42, or main flower, of the broccoli head 44 being trimmed. The fleurettes 51 are connected by relatively short stems 45 to the main stalk 43 of the broccoli head 44.

The major object of the trimming machine and method of the invention 11 is to fragment the broccoli head 44 into a number of separate fleurettes 51 of about the same size.

By precisely positioning a U-shaped guillotine blade 67 relative to the broccoli head 44, fleurettes 51 are produced which meet the size uniformity standards of the packing and freezing industries as well as the needs of purveyors of foods for fresh salad bars and the like.

As will be noted, the relatively small embodiment of the concept disclosed herein utilizes only four collars 47 and attendant broccoli heads 44 on each conveyor flight 32. In a full-size commercial installation larger machines and multiple machines could be used.

In the interests of clarity only one head of broccoli 44, one guillotine blade 67 and one positioning cap 68 will be described in the following description and shown in the related drawing figures. As will be understood, however, even in the relatively small embodiment shown, and with the method described herein, each trimming cycle yields the fleurettes of four heads of broccoli. Since, in the prototype shown, each cycle of operation is completed in approximately two and a half seconds, including the time required for a flight to move ahead and to halt while trimming occurs, it can be seen that during each minute of operation the fleurettes from about ninety six heads of broccoli will be trimmed and carried away for appropriate disposition.

At the loading station 14, one or more operators transfer four heads of broccoli per cycle from the cross-conveyor 46 and insert the base, or butt end, of the stalk downwardly into the vertically elongated opening 52 in the inflated collar 47. Some degree of force is required since the pneumatically-inflated innermost wall defining the central opening 52 exerts a yielding but palpable resistance to the stalk. It is this frictional force which securely positions the broccoli heads in the collars as the conveyor transports the heads to the pre-positioning station 15 and to the trimming station 16 and which thereafter retains the trimmed stalks in the collars until the stalks are dislodged from the collars at the stalk ejecting station 17.

It should be noted that the stalk 43 should initially be inserted well into the collar by the operator(s) so that the stalk is firmly gripped and positioned in upright posture. Then, as the heads arrive at the pre-positioning station 15, the bottom, or butt, end of the stalk is engaged by the upper end 25 of a ram 23 which moves upwardly and forcefully urges the stalk 43 upwardly far enough so that the top of the broccoli flower will necessarily be engaged by the surface of the vaulted dome 69, or recess, in the positioning cap 68 when the cap 68 is translated to fully projected position, as appears in FIGS. 5–7.

In other words, by allowing the positioning cap 68 to engage and urge the broccoli head 44 axially downwardly into the collar 47 until the positioning cap 68 reaches the end of its stroke, the portion of the broccoli head 44 containing the fleurettes 51 will be precisely and uniformly located in the most advantageous position for trimming by the U-shaped guillotine blades 67 as the blades sweep through their predetermined arcs. The function of the stalk pre-positioning ram 23 is to make sure that the positioning cap 68 will engage the top of the main broccoli head even though the operator(s) at the loading station insert the stalk too far into the collar 47.

As previously explained, the programmed controller 21 regulates the cycles of operation and, in conjunction with the flags 63 on each flight 32 and the two proximity switches 64 and 66 on the frame, the controller 21 serves to halt movement so that the longitudinal axes 70 of the stalks 43 of the heads 44 to be trimmed are at a predetermined, exact location. At this juncture, the plane of the conveyor flight 32 is at approximately forty five degrees from horizontal, as best appears in FIGS. 4, 5 and 6.

Figure 4:
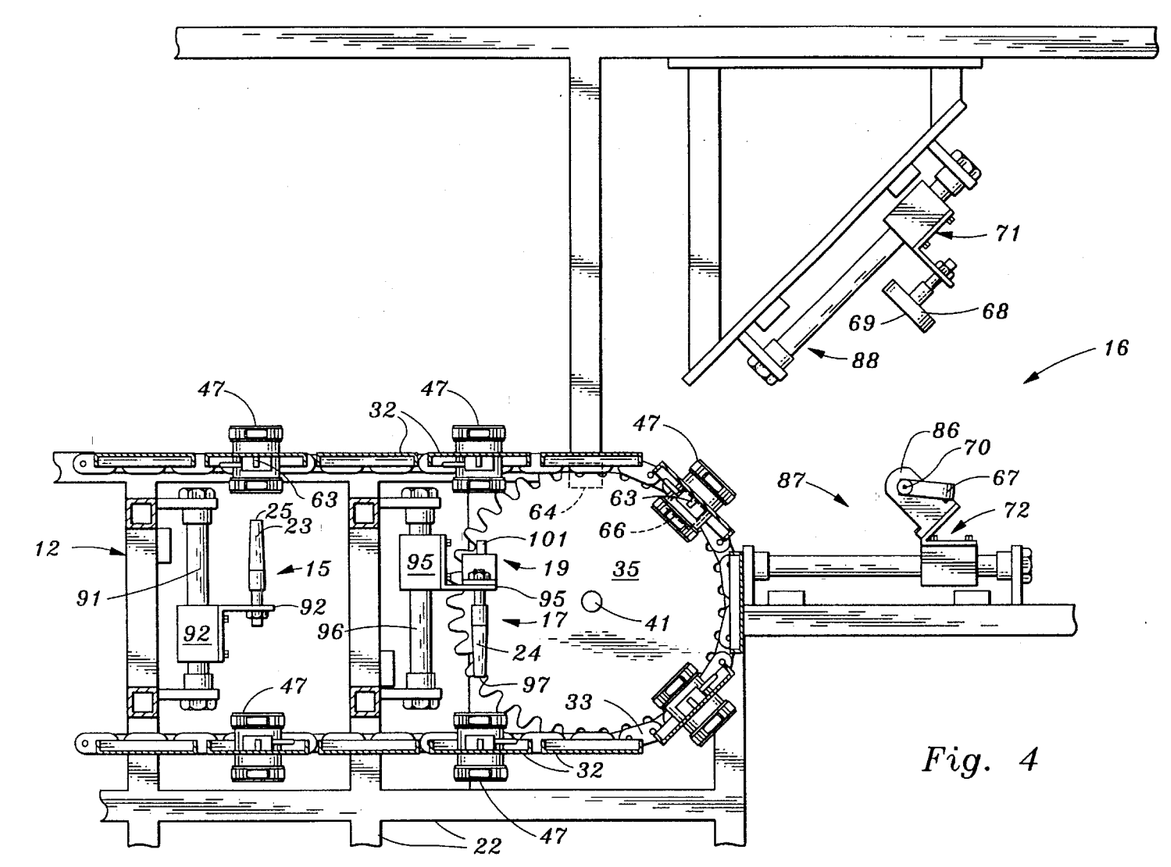
FIG. 4 is a longitudinal sectional view to an enlarged scale, taken on the line 4—4 in FIG. 2, showing the pre-positioner, the stalk ejector, the positioning cap and the guillotine blade in base, or retracted location, with portions of the figure broken away to reduce the extent thereof.
Figure 5:
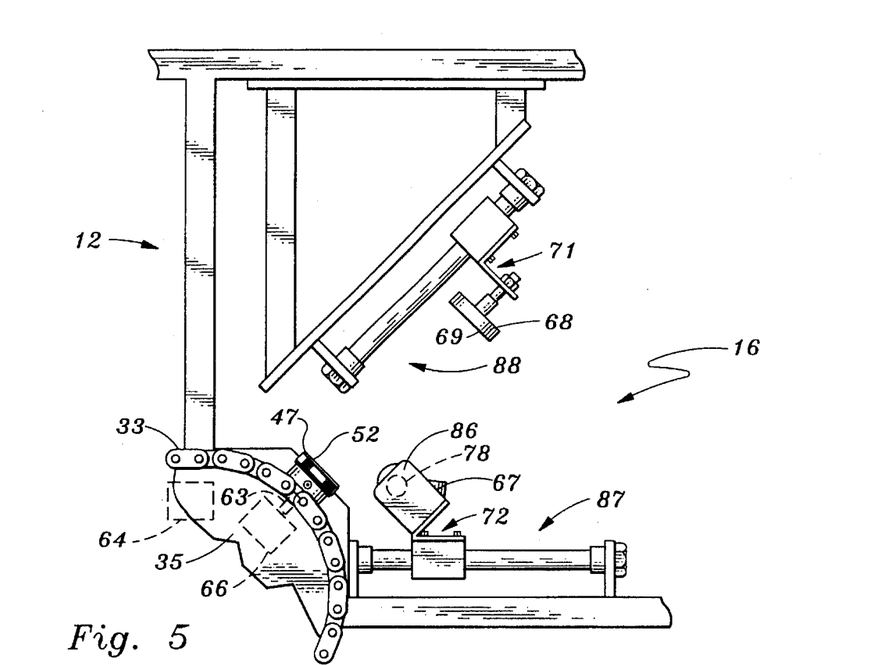
FIG. 5 is a fragmentary, longitudinal sectional view, comparable to the trimming end portion of FIG. 4 but with the positioning cap and the guillotine blade in operative position.
Figure 6:
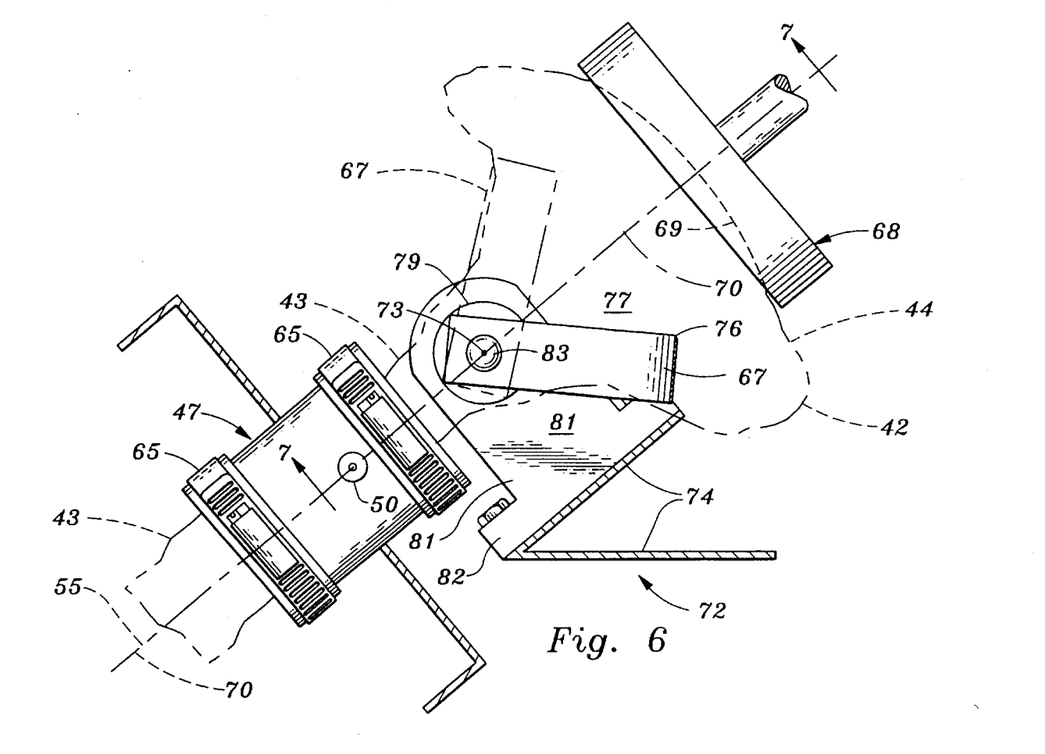
FIG. 6 is a fragmentary, longitudinal sectional view, to an enlarged scale, of the positioning cap and the guillotine blade.
Figure 7:
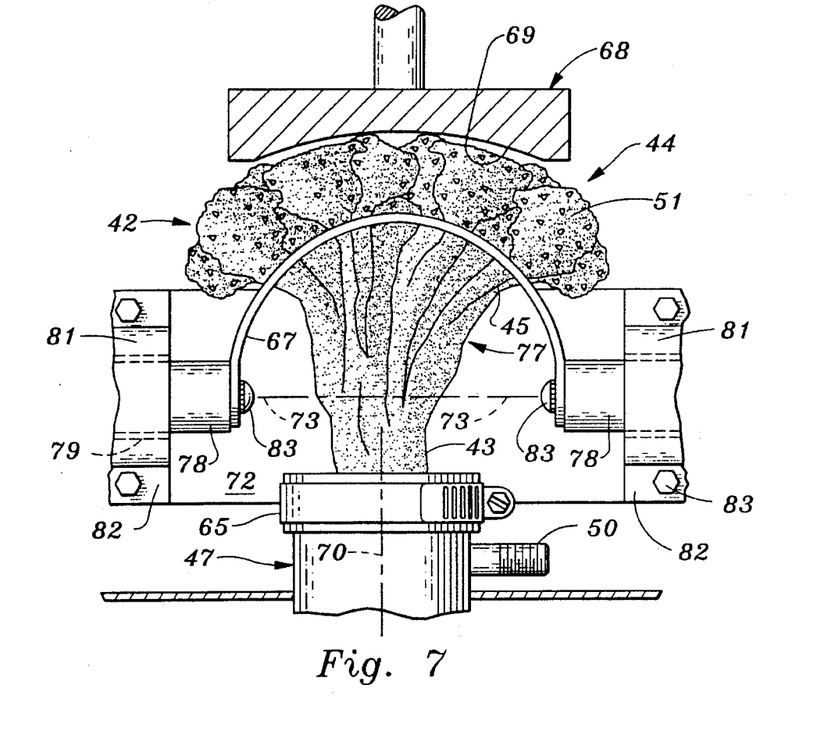
FIG. 7 is a fragmentary, transverse sectional view, to an enlarged scale, taken on the line 7—7 in FIG. 6, but with the guillotine blade in mid or axial position and with the previously cut half of the fleurettes removed to clarify the disclosure.

Slightly prior to the instant the broccoli heads 44 reach and stop at this critical position, a blade assembly 72 (supporting the guillotine blades 67 as shown in FIG. 4) moves horizontally toward the inclined flight 32 and stops when the horizontal axis of rotation 73 of the guillotine blades 67 intersects the longitudinal axis 70 of the respective stalks 43 (see FIGS. 6 and 7).

At about the same microsecond (see FIG. 10) the carriage 71 supporting the positioning cap 68 is actuated by the controller 21, causing the carriage 71 to translate axially toward and urge the positioning cap 68 into engagement with the top surface of the broccoli head 44 and then stop at a predetermined position, thereby locating the head at optimum position for trimming uniformly-sized fleurettes.

At this juncture, the guillotine blade 67 is in its base, or retracted position, as best appears in full line in FIG. 6. Ideally, the head of broccoli 44 assumes the size and shape shown in outline in FIG. 6. In this idealized condition, the sharpened leading edge 76 of the guillotine blade 67 is located at or in the vicinity of the portion of the head 44 where the stems 45 of the fleurettes 51 join the branching portion 77 of the stalk 43.

The guillotine blade 67 is preferably a piece of thin spring steel cut to length, drilled to form to openings near the ends and curved, under spring tension, to fit on respective threaded pins projecting toward each other from two reciprocable shafts 78 journaled in bearings 79 mounted in pillow blocks 81 having bases 82 secured to the top bar of a V-shaped-in-section channel 74 forming a portion of the blade assembly 72. The two ends of the guillotine blade 67 are made fast to the ends of the shafts 78 by suitable fasteners 83 including acorn nuts and lock washers, for example.

The shafts 78 and the guillotine blades 67 rotate about the horizontal transverse axis 73 which, as previously noted, ideally intersects the longitudinal axis 70 of the stalk 43.

Rotation of the shafts 78 and the attendant guillotine blade 67 from the base position shown in full line in FIG. 6, through the mid position coinciding with the axis 70 of the stalk 43, as appears in FIG. 7, and ending at the terminal position, shown in broken line in FIG. 6, is preferably effected by a pair of conventional compressed air driven, 180° vane type rotary actuators 86, located on opposite ends of the linear array of guillotine blades 67, as best appears in FIG. 1. Rotary actuators 86 of the Series NCRB type are used in the embodiment shown and are available from SMC Pneumatics Inc. of Indianapolis, Ind.

Figure 10:
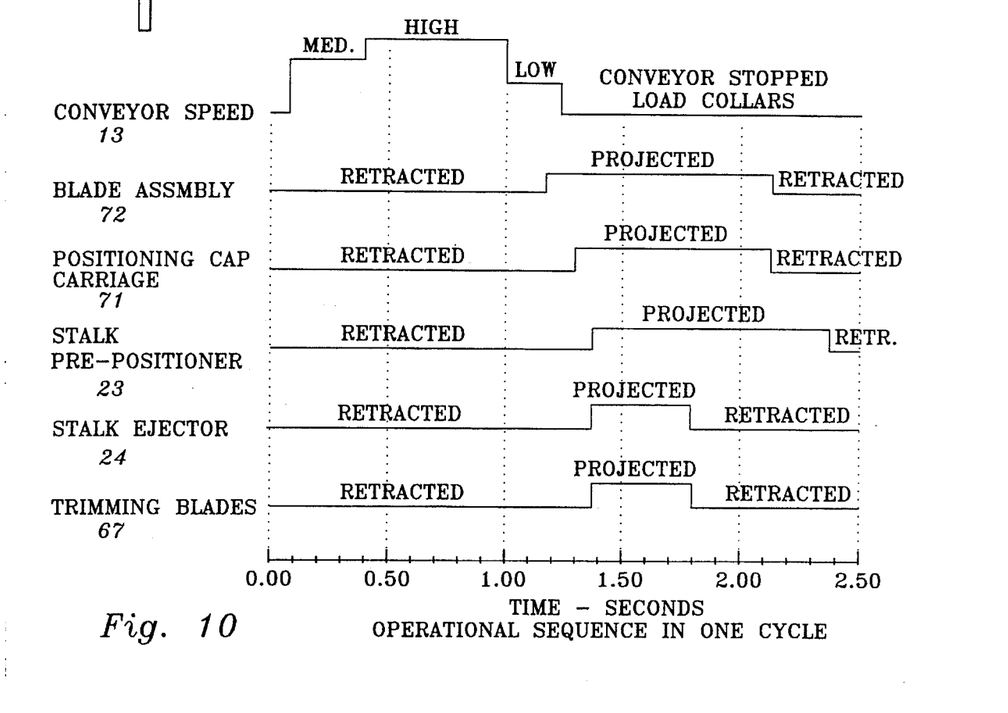

As will be recognized, the torque exerted at opposite ends of the linear array of the blades 67 is transmitted through the blades themselves so that all of the shafts 78 and all of the blades 67 move in virtual unison to effect substantially instantaneous trimming of the four heads of broccoli, followed by return to base, or retracted, position of the transverse channel 74 of the blade assembly 72 and concurrent reversal of the four blades 67 to base, or retracted, position (see FIG. 10).

Also, in accordance with instructions generated by the controller 21, the carriage 71 supporting the positioning cap 68 is returned to retracted position, as shown in FIG. 10.

Both the blade assembly 72 and the positioning cap carriage 71 are constructed in somewhat similar fashion, namely, by providing, at opposite ends of both the transverse channel 74 of the blade assembly 72 and the transverse carriage structure 71, a respective pair of conventional rodless air cylinders 87 and 88. These rodless cylinders can, for example, be of the Series NCY 1 type, also manufactured by SMC Pneumatics Inc.

Inasmuch as rodless air cylinders of the above identified type also actuate the stalk pre-positioning ram 23 at the stalk pre-positioning station 15 and the stalk-ejecting ram 24 at the stalk ejecting station 17, both of these stations will be described at this time.

Figure 9A:
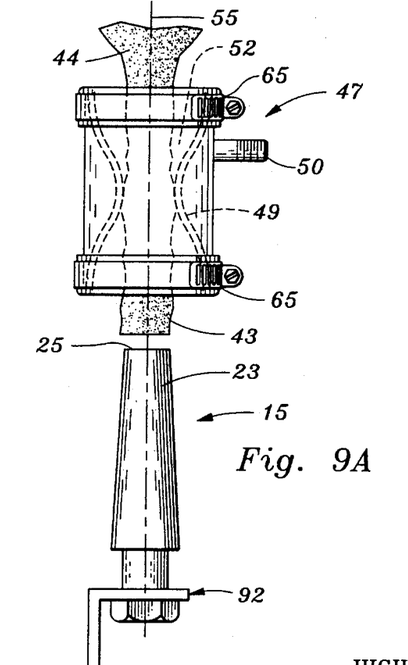
FIG. 9A is a fragmentary, side elevational view illustrating the stalk pre-positioner.

The stalk pre-positioning station 15 is located between the upper and lower runs of the conveyor 13 and is mounted on the frame 12 so that as the stalk pre-positioning ram 23 moves from base, or retracted, position to projected position, the upper tip 25 of the ram 23 travels in a vertical, upward path in alignment with the axis 55 of the respective collar 47 (see FIGS. 4 and 9A). There are four rams 23 in a transverse row, one ram for each collar in the respective conveyor flight. The actuating air cylinder 91 is arranged so that the stroke of the slider 92 on the cylinder 91 causes the upper tip 25 of the ram 23 to abut the bottom end of the stalk 43, urge the stalk axially upwardly and then stop at a predetermined point. The predetermined point is ascertained by reference to the overall length of the shortest head of broccoli expected to be handled. Since the overall lengths of the broccoli heads do not ordinarily vary to any significant extent, the initial setting of the cylinder 91 and the ram 23 usually suffices for most loads. If a load is received having widely varying stalk lengths it might be necessary to cut some length from the butt ends of stalks on the longest heads.

In any event, the ram 23 serves to pre-position the head of broccoli axially in the collar so that when the broccoli head arrives at the trimming station 16, the positioning cap 68 will invariably encounter the top of the head as the cap descends and will urge the broccoli head axially in the collar 47 until the main broccoli flower 42 is in optimum position for severing as the guillotine blades 67 slice through the base of the fleurette stems, i.e. where the stems 45 join the main stalk 43.

Figure 9B:
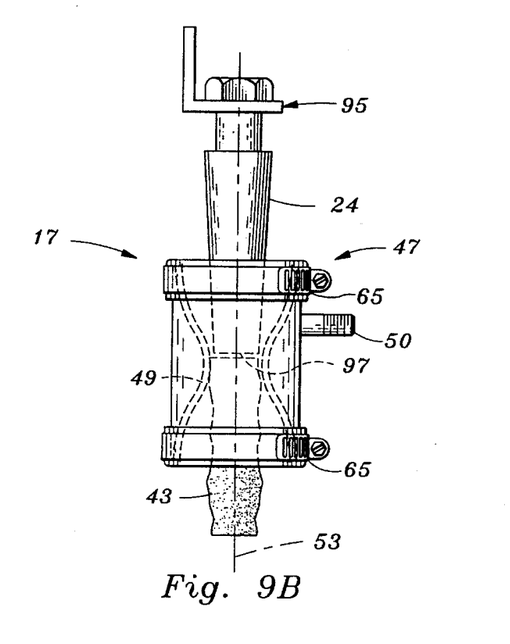
FIG. 9B is a fragmentary side elevational view showing a stalk ejector in projected position dislodging a stalk from the collar; and, FIG. 10 is a series of graphs illustrating the operational sequence of the machine's components during a trimming cycle.

The stalk ejecting station 17 (see FIGS. 4 and 9B), includes a stalk ejecting ram 24 actuated by the flanged slider 95 of a rodless air cylinder 96 and is similar in some respects to the stalk pre-positioning station 15 described above, but acts in a vertically downward direction, with the tip 97 of the ram 24 abutting the adjacent butt end of the inverted denuded stalk when the stalk is held by the inverted collar 47 on the lower run of the conveyor. The cylinder 96 and slider 95 are arranged so that at the end of the stroke the rams 24 have entirely dislodged the denuded stalks from the respective collars. As the inverted denuded stalks are ejected in a downward direction they drop onto a transverse conveyor 93 (see FIGS. 1 and 3) and are removed to another location for further processing.

Although not disclosed in detail herein, the collar-inflating station 19 (see FIG. 4) is also located between the upper and lower runs of the endless conveyor 13 and is appropriately mounted on a platform secured to the frame 12. The collar-inflating station 19 includes two nozzles 101 connected by hoses to the pressurized air supply 20. At suitable intervals, such as every eight hours, all of the collars 47 are re-charged to compensate for any possible air leakage. Re-charging is effected on four collars at a time, while the machine is operating under manual rather than automatic control the nozzles 101 being introduced into the respective Schroeder air-check valves 50 installed on the double-walled elastomeric inserts 49 on each collar 47.

As indicated above, in order to accomplish air recharging, the controller program is temporarily by-passed and the conveyor 13 is operated under supervised manual control. Suitable means for very accurately indexing the nozzles 101 relative to the stems of the Schroeder valves 50 are provided. Since the elastomeric inserts 49 are charged only to a pressure of two to three p.s.i. each battery of four collars is charged virtually instantaneously and the conveyor is advanced until the next battery of Schroeder valves on the four collars is indexed to the respective four air nozzles 101. The entire air re-charging procedure thus requires only a relatively few minutes, at the start of each shift, for example, at which time the programmed controller 21 is again returned to operative condition and automatic trimming is resumed.

In the embodiment disclosed herein, the controller 21 is programmed to provide a trimming cycle approximately two and a half seconds in length. In other words, at about every two and a half seconds, the conveyor 13 starts from a dead stop, advances exactly the distance between the rows and comes to a dead stop. In this interval several operations take place.

FIG. 10 illustrates in graph form, the various operational sequences as a function of time.

The conveyor 13 starts from a dead stop and, as programmed, quickly goes from medium to high speed. Then, at about one second, under the influence of the flag 63 and first proximity switch 64, drops to low speed, and thence to dead stop under the influence of the flag 63 on the second proximity switch 66. The conveyor remains at a dead stop for about one and one half seconds.

While in the conveyor-stop portion of the cycle, the operator(s) load four heads of broccoli into the respective four collars in the adjacent transverse flight at the loading station 14.

At about the same time, the four stalk prepositioning rams 23 at the pre-positioning station 15 translate upwardly into engagement with the superajacent butt ends of the stalks, pushing the stalks far enough upwardly so that the tops of the previously loaded four broccoli heads will necessarily be engaged in due course by the four positioning caps 68 at the trimming station 16, the stalk pre-positioning rams 23 then returning to lowermost, or base, position, awaiting the next command from the controller 21.

Substantially concurrently, at the trimming station 16, the four positioning caps 68 move angularly downwardly in axial alignment with the four stalk axes and push the previously pre-positioned broccoli heads back into their respective four collars far enough to position the fleurettes in optimum location for severing by the respective four guillotine blades 67 which, in the meantime, have been properly positioned by projected movement of the blade assembly 72.

After trimming is effected, the four positioning caps 68 on their carriage 71 and the four guillotine blades 67 on their blade assembly 72 retract into base position, awaiting the next command from the controller 21.

It is to be noted that the head positioning caps 68 not only axially relocate the broccoli heads for optimum trimming; the positioning caps 68 also deflect and guide the cut fleurettes downwardly to the fleurette-collecting station 18 and thereby reduce the random dispersal of the fleurettes as they are severed from the stalks by the very rapidly moving guillotine blades 67 as the blades sweep through their arc of approximately one hundred and seventy degrees. At the collecting station 18, the fleurettes come to rest in a bin or on a suitable conveyor for transfer elsewhere.

Lastly, the portion of the cycle during which the conveyor is stopped is utilized by the four stalk-ejecting rams 24 to dislodge four denuded stalks from their respective collars 47. In other words, the rams 24 are translated downwardly into axial abutment with the subjacent butt ends of the inverted, denuded stalks, causing the denuded stalks to drop onto the cross conveyor 93 below the bottom run of the main conveyor 13, the cross conveyor carrying the denuded stalks to another location for suitable treatment as previously stated.

With the denuded stalks removed by the rams 24, the empty collars 47 on their respective flight 32 are prepared to receive the four heads of untrimmed broccoli as the empty flight reaches the loading station 14.

The foregoing operations are repeated approximately each two and a half seconds. Thus, even on the relatively small embodiment disclosed herein, and under test conditions, each minute of operation results in about twenty four cycles and, accordingly, the trimming of about ninety six to one hundred heads of broccoli, a substantial improvement over the hand labor intensive procedure presently in use in the industry.

What is claimed is:

1. A method of trimming broccoli heads having a stalk and fleurettes, said method comprising the steps of:
    a. providing an inflatable collar capable of securely gripping the base of the stalk;
    b. inserting the base of the stalk into the collar so that the fleurettes are exposed;
    c. positioning the collar so that the exposed fleurettes are located at a predetermined point;
    d. providing an arcuate guillotine blade pivotally mounted on an axis bisecting the stalk when the exposed fleurettes are located at the predetermined point.
    e. rotating the guillotine blade through a predetermined angle such that the fleurettes are severed from the stalk; and,
    f. removing the stalk from the collar.

2. A method as in claim 1 including the additional steps of:
    g. providing a cap having a dome-shaped recess with a surface conforming substantially to the top profile of the exposed fleurettes; and,
    h. urging the cap toward the exposed fleurettes in a direction coincident with the axis of the stalk so that the surface of the dome engages the top of the exposed fleurettes prior to step 1*e*.

3. A method as in claim 2 including the additional step of axially urging the cap against the exposed fleurettes as in step 2*h* so that the stalk is translated within the collar until the exposed fleurettes are located at the predetermined point.

4. Broccoli trimming apparatus for separating the fleurettes from the stalk of a head of broccoli, said apparatus comprising:
    a. an elongated frame extending longitudinally from a loading end to a trimming end and transversely between opposite lateral sides;
    b. an endless conveyor including an upper run and a lower run;
    c. means for mounting said conveyor on said frame so that said upper run is adapted to advance from said loading end toward said trimming end;
    d. collar means mounted on said conveyor for gripping the stalk portion of the head while exposing the fleurettes;
    e. conveyor drive means mounted on said frame and connected to said conveyor for advancing said upper run toward said trimming end;
    f. an arcuate guillotine blade;
    g. means for mounting said guillotine blade on said trimming end of said frame for rotation about a transverse axis and for movement of said guillotine blade between a first position distant from said conveyor and a second position adjacent said conveyor;
    h. control means connected to said conveyor drive means for halting the advance of said conveyor and connected to said guillotine blade mounting means for moving said guillotine blade from said first position to said second position as said collar means indexes with said guillotine blade and the attendant head of broccoli comes within the reach of said guillotine blade;
    i. actuator means connected to said guillotine blade for rotation of said guillotine blade about said transverse axis, said actuator means being connected to said control means for rotation of said guillotine blade while said guillotine blade is in said second position; and,
    j. means for ejecting the stalk from said collar.

5. A method of trimming fleurettes from the stalk of a head of broccoli comprising the steps of:
    a. positioning the head upright with the stalk axis in predetermined attitude;
    b. positioning the head axially so that the top of the head is located at a preselected optimum point;
    c. providing an arcuate blade pivoted on an axis intersecting the stalk axis at approximately ninety degrees; and,
    d. sweeping the blade through approximately one hundred and seventy degrees of arc to sever the fleurettes from the stalk in the path of the blade, the midpoint of the arc being located approximately on the stalk axis.

* * * * *